US010164976B2

United States Patent
Bae et al.

(10) Patent No.: US 10,164,976 B2
(45) Date of Patent: Dec. 25, 2018

(54) METHOD AND APPARATUS FOR SUBSTITUTING FOR AUTHENTICATION AND PAYMENT FOR THIRD PARTY SITE IN A RADIO MOBILE COMMUNICATION SYSTEM

(71) Applicant: Samsung Electronics Co., Ltd., Gyeonggi-do (KR)

(72) Inventors: Su-Jin Bae, Gyeonggi-do (KR); Young-Ki Jeon, Gyeonggi-do (KR)

(73) Assignee: Samsung Eelctronics Co., Ltd., Suwon-si (KR)

( * ) Notice: Subject to any disclaimer, the term of this patent is extended or adjusted under 35 U.S.C. 154(b) by 255 days.

(21) Appl. No.: 14/370,011

(22) PCT Filed: Dec. 28, 2012

(86) PCT No.: PCT/KR2012/011796
§ 371 (c)(1),
(2) Date: Jun. 30, 2014

(87) PCT Pub. No.: WO2013/100731
PCT Pub. Date: Jul. 4, 2013

(65) Prior Publication Data
US 2014/0357231 A1    Dec. 4, 2014

(30) Foreign Application Priority Data
Dec. 28, 2011    (KR) .................. 10-2011-0144267

(51) Int. Cl.
*G06F 7/04* (2006.01)
*H04L 29/06* (2006.01)
(Continued)

(52) U.S. Cl.
CPC ......... *H04L 63/0876* (2013.01); *G06Q 20/16* (2013.01); *G06Q 20/325* (2013.01); *H04W 12/06* (2013.01); *H04W 8/18* (2013.01)

(58) Field of Classification Search
CPC ........... H04L 63/0815; H04L 63/0876; H04W 12/06; H04W 8/18
(Continued)

(56) References Cited

U.S. PATENT DOCUMENTS 5,944,824 A * 8/1999 He .......................... G06F 21/33
726/6
2001/0027528 A1* 10/2001 Pirkey ................... H04W 12/12
726/21
(Continued)

FOREIGN PATENT DOCUMENTS

| JP | 2008-181427 A | 8/2008 |
| KR | 10-2005-0096093 | 10/2005 |
| KR | 10-2006-0035213 | 4/2006 |

OTHER PUBLICATIONS

Michael, Katina, and M. G. Michael. "The proliferation of identification techniques for citizens throughout the ages." (2006).*
(Continued)

*Primary Examiner* — Samson B Lemma

(57) ABSTRACT

Disclosed is a method of substituting for authentication of subscriber terminals of a mobile communication network for a third party site in a radio mobile communication system, the method including: obtaining traffic information for each subscriber terminal from the mobile communication network to which the subscriber terminals connect; receiving an authentication request for a first subscriber terminal from the third party site that has received a service request of the first subscriber terminal from the mobile communication network; and authenticating, if an IP address of the first subscriber terminal is one of IP addresses of the subscriber terminals contained in the traffic information, the first subscriber terminal using traffic information of the first subscriber terminal, and providing an authentication result to the third party site.

20 Claims, 7 Drawing Sheets

(51) Int. Cl.
*H04W 12/06* (2009.01)
*G06Q 20/16* (2012.01)
*G06Q 20/32* (2012.01)
*H04W 8/18* (2009.01)

(58) Field of Classification Search
USPC ............................................................ 726/4
See application file for complete search history.

(56) References Cited

U.S. PATENT DOCUMENTS

| | | | |
|---|---|---|---|
| 2004/0193712 A1* | 9/2004 | Benenati | H04L 63/0815 709/225 |
| 2005/0071244 A1* | 3/2005 | Phillips | G06Q 10/08 705/26.41 |
| 2008/0184354 A1* | 7/2008 | Yamazaki | G06F 21/41 726/8 |
| 2009/0100131 A1 | 4/2009 | Lerner | |
| 2010/0191602 A1 | 7/2010 | Mikkelsen et al. | |
| 2010/0281530 A1* | 11/2010 | Tarkoma | G06F 21/305 726/9 |
| 2012/0023556 A1* | 1/2012 | Schultz | G06F 21/41 726/4 |

OTHER PUBLICATIONS

International Search Report dated Apr. 19, 2013 in connection with International Patent Application No. PCT/KR2012/011796, 3 pages.
Written Opinion of International Searching Authority dated Apr. 19, 2013 in connection with International Patent Application No. PCT/KR2012/011796, 6 pages.
Korean Intellectual Property Office, Notification of the Reasons for Rejection regarding Application No. 10-2011-00144267, dated Jul. 18, 2018, 7 pages.

* cited by examiner

[Fig. 1]
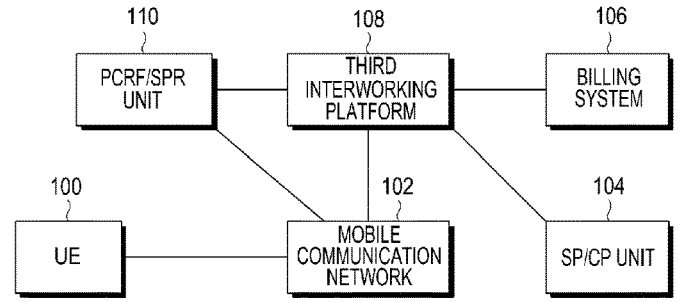
[Fig. 2]
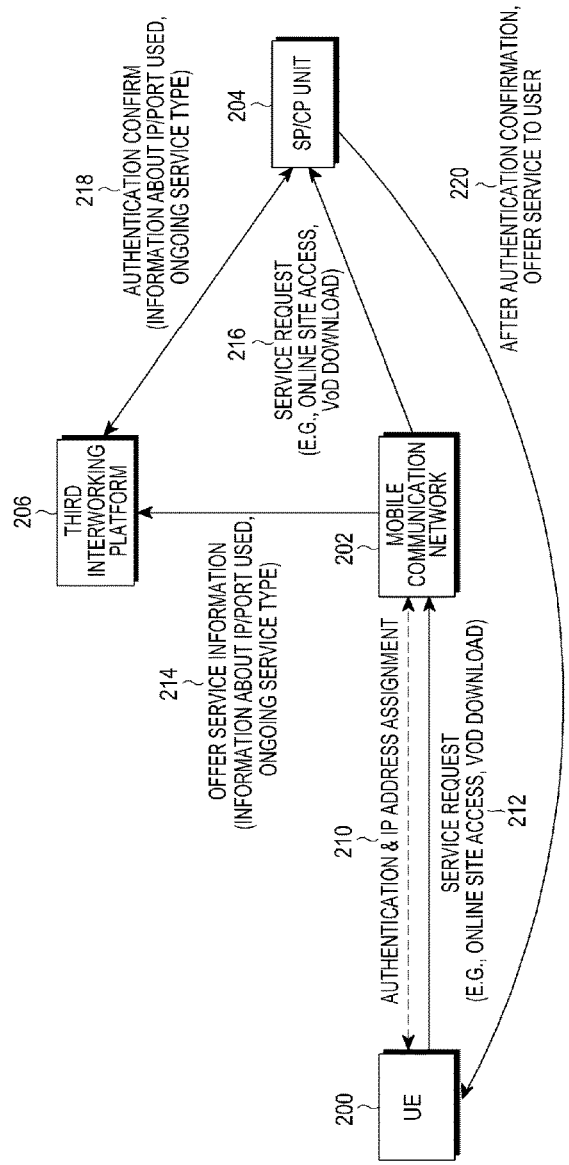

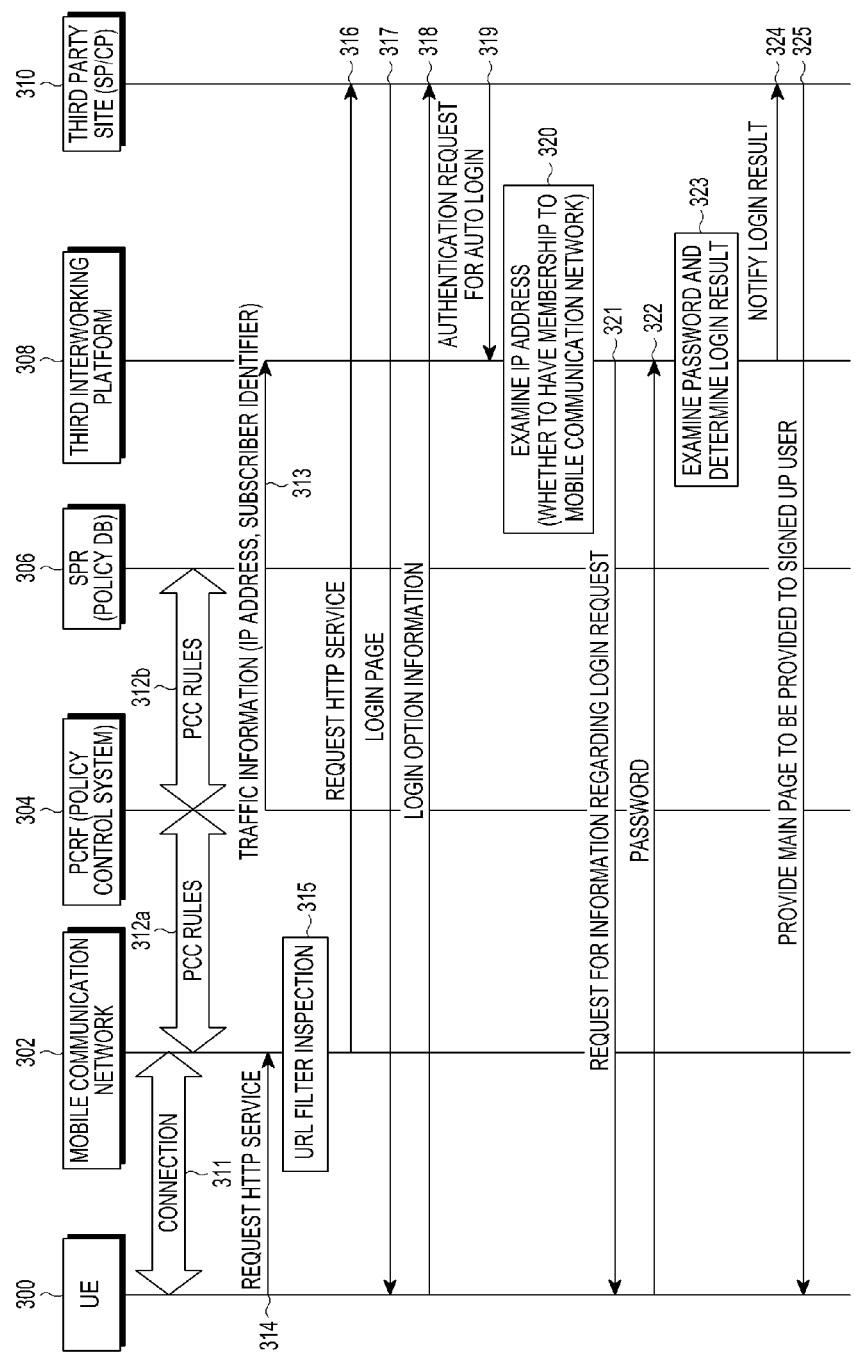
[Fig. 3a]

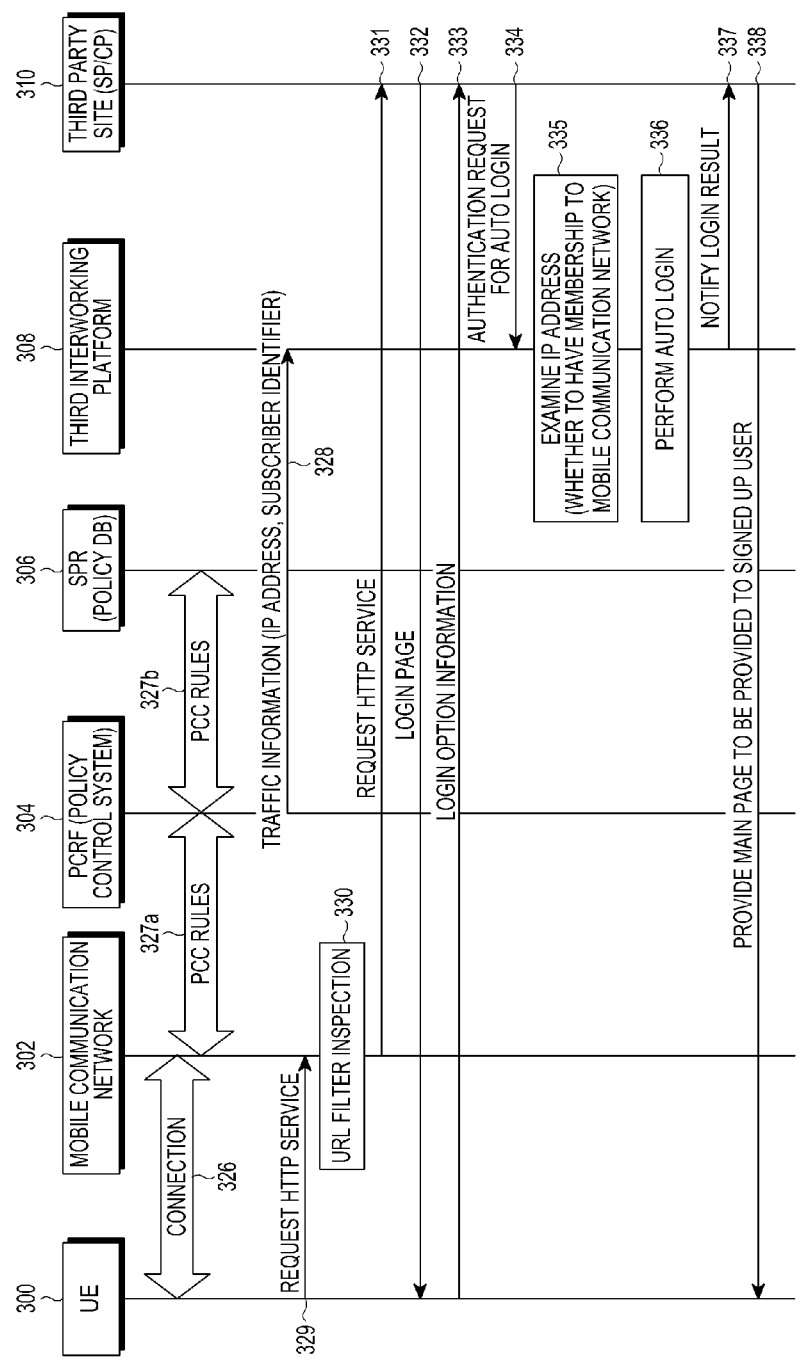
[Fig. 3b]

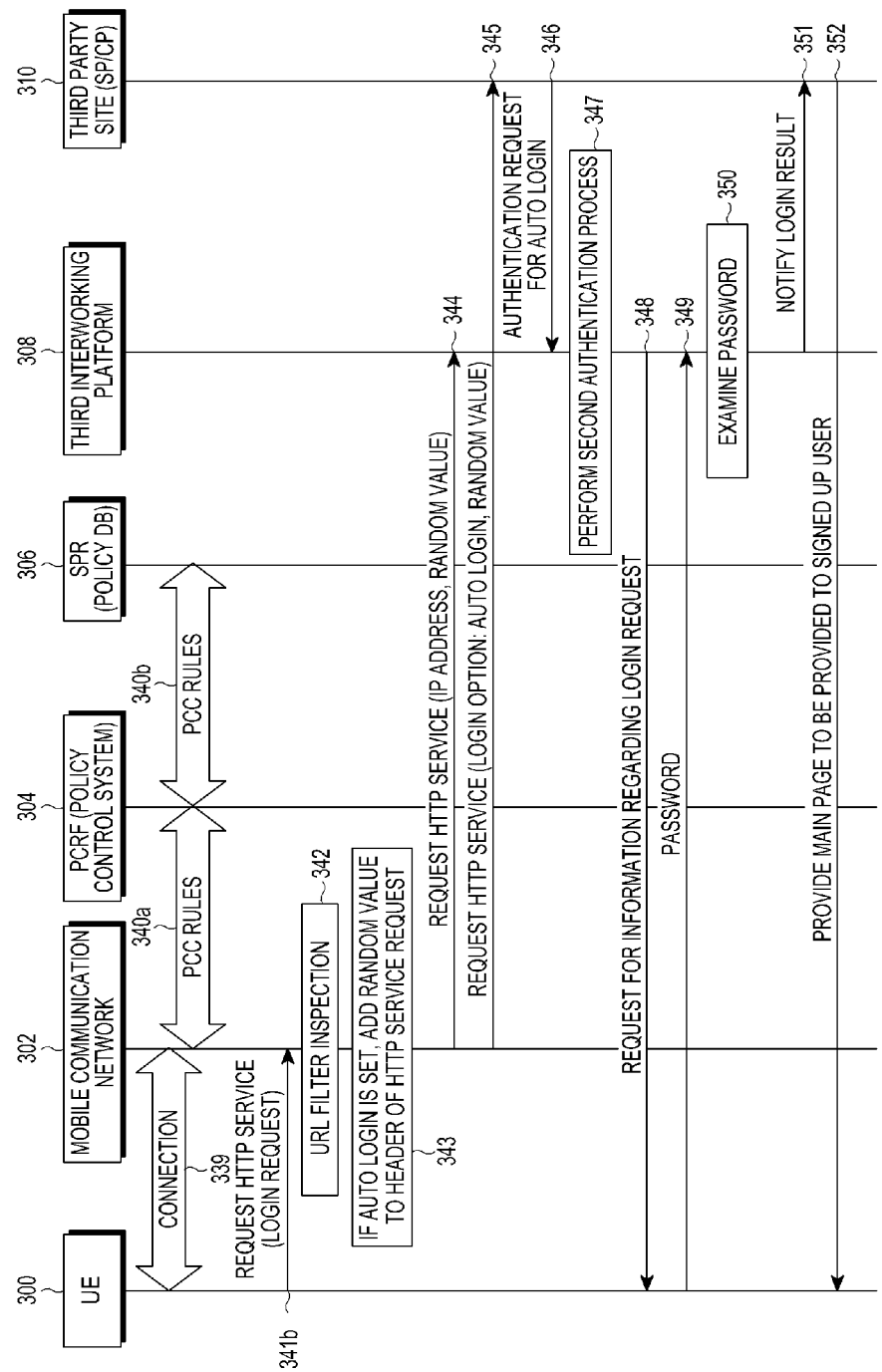

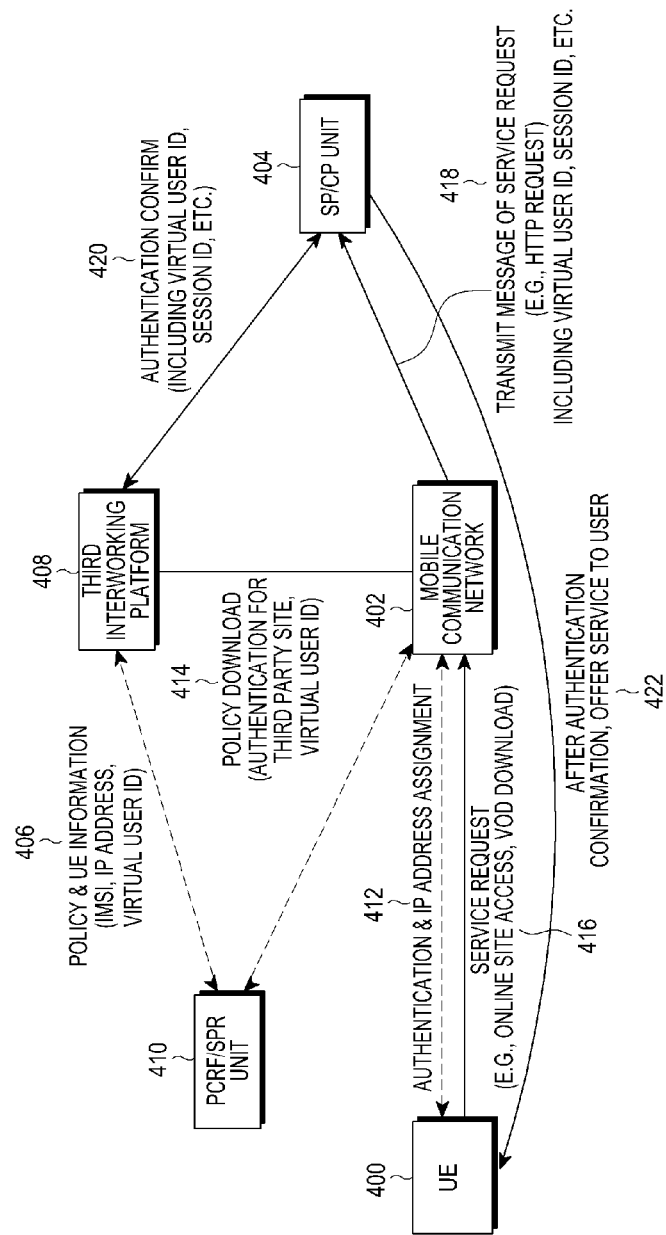
[Fig. 4]

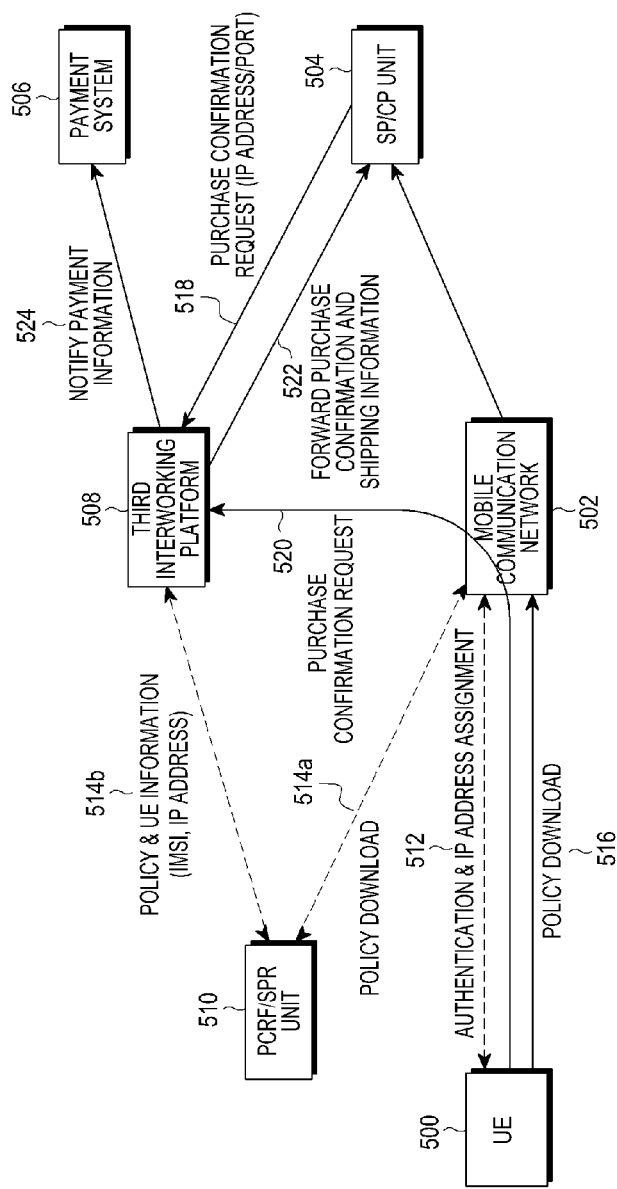
[Fig. 5a]

[Fig. 5b]
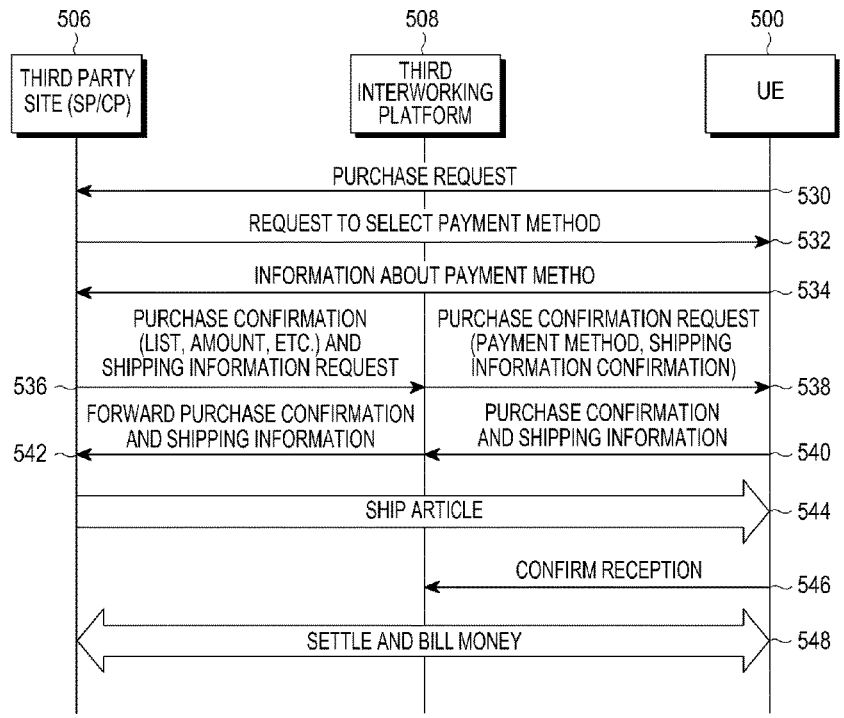
[Fig. 6]
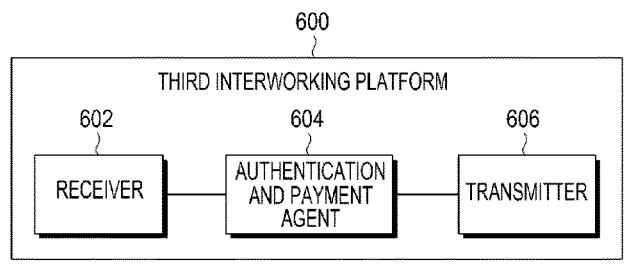
[Fig. 7]
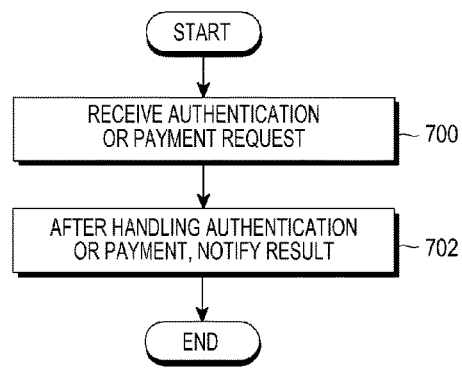

METHOD AND APPARATUS FOR SUBSTITUTING FOR AUTHENTICATION AND PAYMENT FOR THIRD PARTY SITE IN A RADIO MOBILE COMMUNICATION SYSTEM

CROSS-REFERENCE TO RELATED APPLICATION(S)

The present application claims priority under 35 U.S.C. § 365 to International Patent Application No. PCT/KR2012/011796 filed Dec. 28, 2012, entitled "METHOD AND APPARATUS FOR SUBSTITUTING FOR AUTHENTICATION AND PAYMENT FOR THIRD PARTY SITE IN A RADIO MOBILE COMMUNICATION SYSTEM", International Patent Application No. PCT/KR2012/011796 claims priority under 35 U.S.C. § 365 and/or 35 U.S.C. § 119(a) to Korean Patent Application No, 10-2011-0144267 filed Dec. 28, 2011, both of which are incorporated herein by reference into the present disclosure as if fully set forth herein.

TECHNICAL FIELD

The present invention relates to a method and apparatus for providing subscribers of a mobile communication network with a service that substitutes for authentication and payment for a third party site in a radio mobile communication system.

BACKGROUND ART

In a case a subscriber of a mobile communication network wants to get access to a third party site for a service, the user needs to undergo a registration process for signing up for the third party site. Here, the third party site allows the online user or a mobile phone to do an online search, purchase and/or shipment, download the VOD (video on demand), and so on.

In the registration process, the user has to provide his/her private information to a service provider (SP) or content provider (CP) that provides the third party site. Afterwards, each time the user accesses the third party site, the user has to be authenticated by entering his/her identity (ID) and password.

And, even without directly signing up for the third party site, the user may be provided with a service of e.g., making a purchase from the third party via a particular online service provider (e.g., Naver, Google, etc.). However, also in this case, the user has to undergo the registration and authentication processes for subscription to the particular online service provider's site.

DISCLOSURE OF INVENTION

Technical Problem

In other words, in the conventional mobile communication system, ways of providing a service for the user are complex because whenever the user attempts to receive a service, the user needs to sign up for a corresponding SP/CP; and whenever the user accesses the third party site, the user has to go through the authentication process. Furthermore, the user has to provide his/her private information to the SP/CP to be accessed and has to enter his/her ID and password for every authentication. Thus, even for a couple of services for use, the user has to go through the registration process for signing up for each SP/CP and the authentication process in which to enter the private information. In this case, it may happen later that the user cannot remember what site he/she signed up for and/or what ID and password he/she used. This exposes the user to vulnerability in security.

Also, in case the user wants to make a purchase, each time he/she makes a purchase, he/she suffers inconvenience of having to enter e.g., card information and related password.

Solution to Problem

The present invention provides a method and apparatus for substituting for registration and authentication processes for a third site for a subscriber to a mobile communication network to receive a service from the third party site.

In accordance with an aspect of the present invention, provided is a method of substituting for authentication of subscriber terminals of a mobile communication network for a third party site in a radio mobile communication system, the method including: obtaining traffic information for each subscriber terminal from the mobile communication network to which the subscriber terminals connect; receiving an authentication request for a first subscriber terminal from the third party site that has received a service request of the first subscriber terminal from the mobile communication network; and authenticating, if an IP address of the first subscriber terminal is one of IP addresses of the subscriber terminals contained in the traffic information, the first subscriber terminal using traffic information of the first subscriber terminal, and providing an authentication result to the third party site.

In accordance with another aspect of the present invention, provided is a method of substituting for authentication of subscriber terminals of a mobile communication network for a third party site in a radio mobile communication system, the method including: receiving an authentication request for a first subscriber terminal from the third party site that has received a service request of the first subscriber terminal from the mobile communication network; comparing authentication information of the first subscriber terminal received together with the authentication request with authentication information of the first subscriber terminal contained in policy information obtained in advance; and determining an authentication result of the first subscriber terminal according to the comparison, and notifying the third party site of the authentication result.

In accordance with an aspect of the present invention, provided is an apparatus for substituting for authentication of subscriber terminals of a mobile communication network for a third party site in a radio mobile communication system, the apparatus including: a receiver for obtaining traffic information for each subscriber terminal from the mobile communication network to which the subscriber terminals connect; and receiving an authentication request for a first subscriber terminal from the third party site that has received a service request of the first subscriber terminal from the mobile communication network; an authentication and payment agent for authenticating, if an IP address of the first subscriber terminal is one of IP addresses of the subscriber terminals contained in the traffic information, the first subscriber terminal using traffic information of the first subscriber terminal; a transmitter for providing an authentication result to the third party site.

In accordance with another aspect of the present invention, provided is an apparatus for substituting for authentication of subscriber terminals of a mobile communication network for a third party site in a radio mobile communication system, the apparatus comprising: a receiver for receiving an authentication request for a first subscriber terminal from the third party site that has received a service request of the first subscriber terminal from the mobile communication network; an authentication and payment agent for comparing authentication information of the first subscriber terminal received together with the authentication request with authentication information of the first subscriber terminal contained in policy information obtained from a charging policy unit in advance; and determining an authentication result of the first subscriber terminal according to the comparison; and a transmitter for notifying the third party site of the authentication result.

Advantageous Effects of Invention

The present invention gives an advantage of fully securing private information of a subscriber by substituting for registration and authentication processes for the third party site only using subscriber information and authentication information registered for the mobile communication network without need for a separate registration process for each SP/CP; and another advantage of simplifying a procedure of providing a service by eliminating a login process required for providing the service. Furthermore, as to a payment request, card and/or financial information for payment does not have to be sent directly to the SP/CP, thus securing subscriber's information and simplifying the service procedure.

BRIEF DESCRIPTION OF DRAWINGS

The above and other features and advantages of the present invention will become more apparent by describing in detail exemplary embodiments thereof with reference to the attached drawings in which:

FIG. 1 illustrates a network structure, according to an embodiment of the present invention;

FIG. 2 illustrates a network structure that operates according to an embodiment of the present invention;

FIG. 3A is a signal flow among network components, according to an embodiment of the present invention;

FIG. 3B is a signal flow among network components, according to another embodiment of the present invention;

FIG. 3C is a signal flow among network components, according to another embodiment of the present invention;

FIG. 4 illustrates a network structure that operates according to another embodiment of the present invention;

FIG. 5A illustrates a network structure that operates according to another embodiment of the present invention;

FIG. 5B is a signal flow among network components, according to another embodiment of the present invention;

FIG. 6 is a schematic diagram of a third interworking platform, according to an embodiment of the present invention; and FIG. 7 is a flowchart of operations of the third interworking platform, according to an embodiment of the present invention.

BEST MODE FOR CARRYING OUT THE INVENTION

Reference will now be made in detail to embodiments, examples of which are illustrated in the accompanying drawings, wherein like reference numerals refer to the like elements throughout. Descriptions of some well-known technologies that possibly obscure the invention will be omitted, if necessary.

The present invention herein discloses a method and apparatus for substituting for authentication and payment services for a third party site using user information and authentication information registered for a mobile communication network.

FIG. 1 illustrates a network structure, according to an embodiment of the present invention.

Referring to FIG. 1, the network structure includes a user equipment (UE) 100 a user (also referred to as a subscriber) who signs up for a mobile communication network carries, a mobile communication network 101, a service provider/content provider (SP/CP) unit 104, a billing system 106, a third interworking platform 108, and a policy charging rule function/subscription profile repository (PCRF/SPR) unit 110. UEs, as mentioned herein, are assumed to be terminals (also referred to be subscriber terminals) users who have membership to the mobile communication network carries.

The mobile communication network 102 is a core system group for providing a data service in the communication network, providing a packet handling function, and sending to the third interworking platform 108 traffic information resulting from Deep Packet Inspection on a data traffic. As an example, the mobile communication network 102 is a packet data access network and may be supported with Mobile World Interoperability for Microwave Access (Wi-MAX), Wideband Code Division multiple Access High Speed Downlink Packet Access (WCDMA HSDPA), Evolution-data Optimized (DMA EvDO), Long Term Evolution (LTE), asymmetric digital subscriber line (ADSL), and the like.

The SP/CP unit 104 provides an access to a data service, such as the Internet. The SP/CP unit 104, upon request of the UE 100 for a service request, sends an authentication request to the third interworking platform 108 in order to determine whether to accept the service request of the UE 100. In return, the SP/CP unit 104 receives a result of the authentication request from the third interworking platform 108 and provides the UE 100 with the service based on the result.

The third interworking platform 108 manages traffic information obtained through the mobile communication network 102. The traffic information includes, for example, the traffic usage time, a protocol used, bandwidth information and Internet Protocol (IP)/port information, etc. In an embodiment of the present invention, the traffic information includes authentication information to be used in authentication for a third party site. The authentication information will be described below in more detail.

The third interworking platform 108, upon reception of the authentication request from the SP/CP unit 104, authenticates the service request based on the traffic information gathered through the mobile communication network 102 and provides the authentication result to the SP/CP unit 104. Alternatively, the third interworking platform 108 may authenticate the service request without the need for the SP/CP unit 104 to perform a separate authentication process, by mapping unique authentication information obtained through the mobile communication network 102 to authentication information for the service request.

The PCRF/SPR unit 110 stores quality of service (QoS) and payment rule information for each user of the mobile communication network 102 and provides the QoS and payment rule information for each user to the mobile communication network 102 and the third interworking platform 108.

The UE 100 sends a request to offer a service/content through the third interworking platform 108 while having a membership to the mobile communication network 102.

The billing system 106 obtains payment information of the UE from the third interworking platform 108, and later settles up with the SP/CP unit 104 and bills the UE 100.

In FIG. 1, the PCRF/SPR unit 110, the billing system 106 and the third interworking platform 108 are shown as separate components, but may also be implemented as one or more servers.

In an embodiment of the present invention, when a user who has a membership to the mobile communication network 102 wants to use a service provided by the third party site, the third interworking platform 108 performs the authentication process using traffic information for each user obtained through the mobile communication network 102. The traffic information includes identification information of the UE 100 the user carries (e.g., International Mobile Subscriber Identity (IMSI), or International Mobile Equipment Identity (IMEI)), information about IP/port used (or 5-tuple information), and information regarding the data service for which the UE 100 requests the third party site. In a case the user of the mobile communication network 102 requests a service of the third party site, the traffic information includes authentication information to be used to substitute for the authentication for the third party site. The authentication information includes a random value, a password, and the like, which are predetermined by the mobile communication network 102.

FIG. 2 illustrates a network structure that operates according to an embodiment of the present invention.

Referring to FIG. 2, in step 210, a UE 200 performs the authentication process with a mobile communication network 202 to be accessed. With the authentication process, the UE 200 is assigned an IP address from the mobile communication network 202 for the data service from the mobile communication network 202.

After the authentication process, in step 212, the UE 200 sends a request for the data service to the mobile communication network 202. The request for the data service is assumed, in an example, to be a request for access to an Internet site or a request for video-on-demand (VOD) download.

Upon reception of the request for the data service, the mobile communication network 202 provides the traffic information including the identification information of the UE 200, information of the IP/port used (or 5-tuple information) and information regarding the data service to a third interworking platform 206, in step 214. In step 216, the mobile communication network 202 forwards the request for the data service to an SP/CP unit 204. The request for the data service includes traffic information of the UE 200. Here, the SP/CP unit 204 is assumed to be the third party site that provides the requested data service.

Upon reception of the request for the data service, the SP/CP unit 204 searches the traffic information of the UE 200 for a third interworking platform 206 located in IP bands that include an IP that the UE 200 uses. The IP bands are used by the mobile communication network 202. The SP/CP unit 204 transmits the traffic information of the UE 200 to the searched third interworking platform 206, and sends a request for user and service authentication for the data service requested from the UE 200 to the third interworking platform 206. When, upon reception of the user and service authentication request from the SP/CP unit 204, the third interworking platform 206 compares first traffic information received from the mobile communication network 202 with second traffic information received from the SP/CP unit 204, determines based on the comparison whether the user and service authentication was successful, and sends the resultant information to the SP/CP unit 204. If the comparison shows a result that the first traffic information matches the second traffic information, the third interworking platform 206 provides the resultant information indicating that authentication of the data service requested by the UE 200 was successful to the SP/CP unit 204. If the comparison shows a result that the first traffic information does not match the second traffic information, the third interworking platform 206 provides the resultant information indicating that authentication of the data service requested by the UE 200 was failed to the SP/CP unit 204.

Upon reception of the resultant information indicating that the authentication of the data service requested by the UE 200 was successful, the SP/CP unit 204 provides the data service to the UE 200, in step 220. Upon reception of the resultant information indicating that the authentication of the data service requested by the UE 200 was failed, the SP/CP unit 204 notifies the UE 200 that the data service is rejected.

The above embodiment of the present invention will be described below in more detail with reference to FIGS. 3A and 3B.

FIG. 3A is a signal flow among network components, according to an embodiment of the present invention. In a case a UE 300 desiring a service of the third party site selects an auto login option, a third interworking platform 308 reconfirms whether the UE 300 agrees to use its private information for the auto login by giving the UE 300 an opportunity to provide a password. The procedure of reconfirming whether the UE 300 agrees with using the private information is only performed for the UE 300 to access the third party site for the first time after the UE 300 selects the auto login option, or, alternatively, is performed whenever the UE 300 accesses the third party site.

Referring to FIG. 3A, in step 311, the UE 300 performs the authentication process with a mobile communication network 302 to be accessed.

In steps 312a and 312b, the mobile communication network 302 obtains a policy and charging control (PCC) rules stored in a policy database (DB) managed by an SPR 306 through a PCRF 304. The PCC rules are control rules for QoS and charging decision, and include Uniform Resource Locator (URL) filter rules in a case the auto login option is set among various login options for the third party site the UE 300 tries to access.

In step 313, the PCRF 304 sends the traffic information for the UE 300 obtained (not shown) from the mobile communication network 302 to the third interworking platform 308. The traffic information includes identification information of the UE, information about IP address and port used, etc., which is obtained by the mobile communication network 302 in the authentication process with the UE 300.

Later, if the UE 300 sends a request for a third party site's service, i.e., an HTTP service to the mobile communication network 302 in step 314, the mobile communication network 320 performs URL filter inspection that searches for a URL corresponding to the HTTP in step 315. In step 316, the mobile communication network 302 forwards the HTTP service request to e.g., the third party site, i.e., an SP/CP 310 that corresponds to the HTTP.

The third party site 310, upon reception of the HTTP service request, provides a login page for the UE 300 in step 317, and the UE 300 selects a login option and sends information about the selected login option to the third party site 310, in step 318. The login option may be a typical login or the auto login. The typical login refers to a common login process in which the UE 300 performs a membership process to have membership to the third party site 310 and enters an ID and password set up in the membership process on a login page provided by the third party site 310. The auto login enables the UE 300 to use, in the login process, information that has been registered in the authentication process with the mobile communication network 302 for access without need to undergo the membership process with the third party site 310. Assume herein that the UE 300 chooses the 'auto login' as the login option.

Then, in step 319, the third party site 310 sends a request for authentication of the 'auto login' of the UE 300 to the third interworking platform 308. In response, the third interworking platform 308 inspects the IP address of the UE 300 to determine whether the UE 300 has membership to the mobile communication network 302, in step 320. If it is determined that the UE 300 has membership to the mobile communication network 302, the third interworking platform 308 authenticates the UE 300 using the traffic information of the UE 300. As an example, the identification information of the UE 300, e.g., IMSI, IMEI, etc. may be mapped to an ID of the UE 300 for the third party site 310.

In step 321, the third interworking platform 308 sends information regarding the login request to the UE 300. The information regarding the login request includes information for reconfirming whether to agree to use private information for the auto login, and subscriber information (e.g., gender, nationality, etc.) required by the third party site.

If the UE 300, upon reception of the information regarding the login request, agrees to use the private information for the auto login, the UE 300 provides only a password to the third interworking system 308. Here, the password is temporarily set up by the UE 300.

In step 323, the third interworking platform 308 checks if the password has been received from the UE 300, and if the password is received, determines that the UE 300 has agreed to use the private information for the auto login and examines the password. The third interworking platform 308 obtains a password registered by the user of the UE 300 beforehand, or from the PCRF 304. The predetermined password is a value that the mobile communication network 302 sets up beforehand in order to substitute for the authentication for the third party site upon request of users of the mobile communication network 302 for a service of the third party site. Then the third interworking platform 308 compares the received password with the predetermined password to see if they are the same, and if yes, determines that the auto login has been successfully accomplished.

And then, in step 324, the third interworking platform 308 notifies the third party site 310 that the auto login has been successfully accomplished.

Upon reception of the notification of the login result, the third party site 310 provides the UE 300 with a main page provided to the signed up user, in step 325.

FIG. 3B is a signal flow among network components, according to another embodiment of the present invention. The PCRF 304 further sends the third interworking platform 308 the information regarding the auto login to be used in the auto login to the third party site together with the traffic information of the UE 300. Then, the third interworking platform 308 performs the auto login with the information regarding the auto login obtained in advance for the UE that requests the auto login.

Referring to FIG. 3B, in step 326, the UE 300 performs the authentication process with the mobile communication network 302 to be accessed.

In steps 327a and 327b, the mobile communication network 302 obtains via the PCRF 304 PCC rules stored in the policy DB hosted by the SPR 306. The PCC rules are control rules for QoS and charging decision, and include URL filter rules in a case the auto login option is set among various login options for the third party site the UE 300 tries to access.

In step 328, the PCRF 304 sends the traffic information for the UE 300 obtained (not shown) from the mobile communication network 302 to the third interworking platform 308. The traffic information includes identification information of UE, information about an IP address and port used, etc. which is obtained by the mobile communication network 302 in the authentication process with the UE 300. The PCRF 304 also provides authentication information, e.g., the information regarding the auto login including a virtual identifier to be used by the UE 300 in the auto login for the third party site 310.

Later, if the UE 300 sends a request for a third party site's service, i.e., an HTTP service to the mobile communication network 302 in step 329, the mobile communication network 302 performs URL filter inspection that searches for a URL that corresponds to the HTTP in step 330. In step 331, the mobile communication network 302 forwards the HTTP service request to e.g., the third party site, i.e., an SP/CP 310 that corresponds to the HTTP.

The third party site 310, upon reception of the HTTP service request, provides a login page for the UE 300 in step 332, and the UE 300 selects a login option and sends information about the selected login option to the third party site 310, in step 333. Assume herein that the UE 300 chooses the 'auto login' as the login option.

Then, in step 334, the third party site 310 sends a request for authentication of the 'auto login' of the UE 300 to the third interworking platform 308. In response, the third interworking platform 308 inspects the IP address of the UE 300 to determine whether the UE 300 has membership to the mobile communication network 302, in step 335. If it is determined that the UE 300 has membership to the mobile communication network 302, the third interworking platform 308 performs the auto login with the UE's 300ID and password registered by the user of the UE 300 beforehand or obtained from the PCRF 304. The password is a predetermined value to substitute for the authentication for the third party site 310 on request of users of the mobile communication network 302 for a service of the third party site 310.

And then, in step 337, the third interworking platform 308 notifies the third party site 310 that the auto login has been successfully accomplished.

Upon reception of the notification of the login result, the third party site 310 provides the UE 300 with a main page provided for the signed up user, in step 338.

FIG. 3C is a signal flow among network components, according to another embodiment of the present invention. In case the UE 300 wanting to get a service of the third party site 310 chooses the auto login option, the mobile communication network 302 sets up a random value as information to be used for the auto login and sends the random value to the third interworking platform 308. Upon reception of the random value, the third interworking platform 308 reconfirms whether the UE 300 agrees to use private information for the auto login by giving the UE 300 an opportunity to provide its password.

Referring to FIG. 3C, in step 339, the UE 300 performs the authentication process with the mobile communication network 302 to be accessed.

In steps 340a and 340b, the mobile communication network 302 obtains via the PCRF 304 PCC rules stored in the policy DB hosted by the SPR 306. The PCC rules are control rules for QoS and charging decision, and include URL filter rules in a case the auto login option is set among various login options for the third party site the UE 300 tries to access.

In step 341a, the PCRF 304 forwards the traffic information of the UE 300 obtained from the mobile communication network 302 to the third interworking platform 308. The traffic information includes identification information of UE, information about an IP address and port used, etc. which is obtained by the mobile communication network 302 in the authentication process with the UE 300.

Later, if the UE 300 sends a request for a third party site's service, i.e., an HTTP service to the mobile communication network 302 in step 341b, the mobile communication network 302 performs URL filter inspection that searches for a URL that corresponds to the HTTP in step 342. The HTTP service request includes a login option assumed herein to be set up as an auto login option. In this case, the mobile communication network 302 sets up an ID and password as a random value as an example of information to be used in the auto login to the third party site 310 that provides the HTTP service requested by the UE 300, in step 342 and forwards the HTTP service request whose header contains the random value to the third interworking platform 308, in step 344. The HTTP service request includes the UE's 300 IP address and the random value. In step 345, the mobile communication network 302 forwards the HTTP service request to e.g., the third party site, i.e., an SP/CP 310 obtained from the URL filter inspection. The HTTP service request includes information about the login option and the random value.

Then, in step 346, the third party site 310 sends a request for authentication of the 'auto login' of the UE 300 to the third interworking platform 308. In response, the third interworking platform 308 performs a second authentication process, in step 347. In other words, the auto login may be performed using the random value, however the third interworking platform 308 requests the UE 300 for information regarding the login to reconfirm whether the UE 300 agrees to use the private information in the auto login. The information regarding the login includes information for reconfirming whether to agree to use the private information for the auto login, and subscriber information (e.g., gender, nationality, etc.) required by the third party site.

If the UE 300, upon reception of the information regarding the login, agrees to use the private information for the auto login, the UE 300 provides only a password for the third interworking system 308, in step 349. Here, the password is temporarily set up by the UE 300.

In step 350, the third interworking platform 308 checks if the password has been received from the UE 300, and if the password is received, determines that the UE 300 has agreed to use the private information for the auto login and examines the password. The third interworking platform 308 obtains a predetermined password from traffic information obtained from the mobile communication network 302. The predetermined password is a value that the mobile communication network 302 sets up beforehand in order to substitute for the authentication for the third party site 310 upon request of users of the mobile communication network 302 for a service of the third party site 310. Then the third interworking platform 308 compares the received password with the predetermined password to see if they are the same, and if yes, determines that the auto login has been successfully accomplished.

And then, in step 351, the third interworking platform 308 notifies the third party site 310 that the auto login has been successfully accomplished.

Upon reception of the notification of the login result, the third party site 310 provides the UE 300 with a main page provided for the signed up user, in step 352.

In another embodiment of the present invention, when the user who has membership to the mobile communication network 102 wants to use a service provided by the third party site, the third interworking platform obtains policy information for each user through the PCRF/SPR unit and performs authentication using the obtained policy information. The policy information includes identification information of the user (e.g., IMSI), an IP address, information about whether the authentication of the user for the third party site is required, and an identifier for each user. The identifier for each user further includes identification of a virtual user to be used in authentication for the third party site.

FIG. 4 illustrates a network structure that operates according to another embodiment of the present invention.

Referring to FIG. 4, in step 412, a UE 400 performs the authentication procedure with a mobile communication network 402 to be accessed. With the authentication process, the UE 400 is assigned an IP address from the mobile communication network 402 for the data service from the mobile communication network 402.

The mobile communication network 402 obtains from the PCRF/SPR unit 410 and stores the policy information for each user, in step 414. The policy information includes information indicating whether the authentication of the user for the third party site is required, an identifier for each user, and session identification information. The identifier for each user further includes identification of a virtual user to be used in authentication for the third party site.

After the authentication procedure, in step 416, the UE 400 sends a request for the data service to the mobile communication network 402. The data service request is assumed to be e.g., an HTTP request.

Then, in step 418, the mobile communication network 402 determines if the UE 400 is required to be authenticated for the third party site based on the policy information stored in advance. If it is determined that the UE 400 is required to be authenticated for the third party site, the data service request as well as the policy information stored for the UE 400 is forwarded to the SP/CP unit 404. The SP/CP unit 404 is assumed to be a third party site that provides the requested data service.

Upon reception of the policy information and the data service request, the SP/CP unit 404 searches for a third interworking platform 408 located in IP bands that include an IP that the UE 400 that sent the data service request uses. The SP/CP unit 404 sends the policy information to the third interworking platform 408, and sends a user and service authentication request for the data service requested from the UE 400 to the third interworking platform 206. Then, upon reception of the user and service authentication request from the SP/CP unit 404, the third interworking platform 406 compares first policy information received from the PCRF/SPR 410 with second policy information received from the SP/CP unit 404, determines based on the comparison whether the user and service authentication was successful, and sends the resultant information to the SP/CP unit 404. Upon reception of the resultant information that the authentication of the data service requested by the UE 400 was successful, if user information is required to provide the data service, the SP/CP unit 404 requests and confirms the UE 400 for the user information and provides the data service to the UE 400. The user information includes the user's nationality, gender, age, etc.

If the comparison shows that the first policy information matches the second policy information, the third interworking platform 406 provides the resultant information indicating that authentication of the data service requested by the UE 400 was successful to the SP/CP unit 404. If the comparison shows that the first policy information does not match the second policy information according the comparison, the third interworking platform 406 provides the resultant information indicating that authentication of the data service requested by the UE 400 was failed to the SP/CP unit 404.

Upon reception of the resultant information indicating that the authentication of the data service requested by the UE 400 was successful, the SP/CP unit 404 provides the data service to the UE 400, in step 422. Upon reception of the resultant information indicating that the authentication of the data service requested by the UE 400 was failed, the SP/CP unit 404 notifies the UE 400 that the data service is rejected.

In yet another embodiment of the present invention, if the UE that has membership to the mobile communication network needs to pay for a service provided by the third party site, the third interworking platform performs a payment procedure for a purchase after confirming that the UE made the purchase through the third party site.

FIG. 5A illustrates a network structure that operates according to another embodiment of the present invention.

Referring to FIG. 5A, in step 512, a UE 500 performs the authentication process with a mobile communication network 502 to be accessed. With the authentication process, the UE 500 is assigned an IP address from the mobile communication network 502 for the data service from the mobile communication network 502.

The mobile communication network 502 obtains from the PCRF/SPR unit 510 and stores the policy information for each user, in step 514*a*. The policy information includes the user's identification information and IP address, information indicating whether the authentication of the user for the third party site is required, and virtual user's identification information.

In step 516, when requested to pay for an online purchase, the UE 500 sends the payment request to the SP/CP unit 504 via the mobile communication network 520 while using a data service through the mobile communication network 502.

Upon reception of the payment request from the UE 500, the SP/CP unit 504 searches, in step 518, for a third interworking platform 508 located in IP bands that include an IP the UE 500 uses. Then, the SP/CP unit 504 sends payment related information and a request to the third interworking platform 508 to confirm that the UE 500 has purchased an article provided by the SP/CP unit 504. The payment related information includes IP and port information that the UE 500 uses, or information about the UE's 500 virtual user ID, session ID and payment request.

Upon reception of the purchase confirmation request from the SP/CP unit 504, the third interworking platform 508 forwards the purchase confirmation request to the UE 500, in step 520. The purchase confirmation request may be forwarded to the UE 500 in the form of e.g., a short message service (SMS).

Later, upon reception of a reply to the purchase confirmation request from the UE 500 that the UE 500 made the purchase, the third interworking platform 508 forwards to the SP/CP unit 504 the reply and shipping information of the purchase the UE 500 has made, in step 522.

In step 524, the third interworking platform 508 notifies a management system 506 of the payment information for paying for the purchase that the user 500 has made.

FIG. 5B is a signal flow among network components, according to another embodiment of the present invention.

Referring to FIG. 5B, in step 530, the UE 500 forwards a request to purchase an article provided by a third party site 506, i.e., the SP/CP unit 506 to the third party site 506 through the mobile communication network (not shown). In this case, assume that the UE 500 is not logging into the third party site no matter whether the UE 500 has membership to the third party site 506.

The third party site 506 then requests the UE 500 to select a payment method for the purchase request. The payment method includes a credit card payment method, a cash remittance method, a mobile communication network agenting method, or the like. Assume herein that the UE 500 selects the mobile communication network agenting method to be the payment method. Thus, in step 534, the UE 500 sends information about the selected payment method to the third party site 506.

Later, in step 536, the third party site 506 requests the third interworking platform 508 for purchase confirmation and shipping information including a list of articles that the UE 500 has purchased and the amounts. Then, the third interworking platform 508 forwards the request for the purchase confirmation and shipping information to the UE 500, in step 538.

In step 540, the third interworking platform 508 receives the purchase confirmation and shipping information from the UE 500, in step 540, and forwards them to the third party site 506, in step 542.

Upon reception of the purchase confirmation and the shipping information, the third party site 506 ships the article according to the purchase confirmation and the shipping information to a corresponding shipping address.

Confirming reception of the shipped article from the UE 500, the third interworking platform 508 settles payments for the article and gives money to the third party site 506, in step 548, and bills the UE 500 for the money.

As such, even if the UE 500 has purchased an article through the third party site 506, the UE 500 may complete the purchase and make payments without offering the private information to the third party site 506.

FIG. 6 is a schematic diagram of the third interworking platform, according to an embodiment of the present invention. The third interworking platform is located in the mobile communication network.

Referring to FIG. 6, the third interworking platform 600 includes a receiver 602, an authentication and payment agent 604 and a transmitter 606.

The receiver 602 receives from the third party site an authentication request for the first subscriber terminal or a payment request.

The authentication and payment agent 604 substitutes for the authentication request for the first subscriber terminal or the payment request using the traffic information obtained through the mobile communication network or the policy information obtained through the PCRF/SPR unit. The transmitter 606 notifies the third party site of results of the authentication request for the first subscriber terminal or the payment request. Specific embodiments of substituting for the authentication request or the payment request was described in connection with FIGS. 3A to 5B, so the description will be omitted herein.

FIG. 7 is a flowchart of operations of the third interworking platform, according to an embodiment of the present invention.

Referring to FIG. 7, the third interworking platform receives an authentication request for a subscriber terminal or a payment request from the third party site, in step 700, and proceeds to step 720. Here, the subscriber terminal has membership to a mobile communication network hosted by the third interworking platform, and an authentication procedure for connection has been completed. The third interworking platform obtains traffic information for each of subscriber terminals within the coverage of the mobile communication network, or obtains policy information for each subscriber in advance through the PCRF/SPR unit.

In step 702, the third interworking platform substitutes for the authentication of the subscriber terminal with the traffic information or substitutes for the payment that the subscriber terminal requests with the policy terminal, and then notifies the third party site of authentication and payment results.

In the case of substituting for the authentication of the subscriber terminal, the third interworking platform inquires about whether the subscriber terminal agrees to use its traffic information, and upon reception of the password from the subscriber terminal, determines that the subscriber terminal agrees to use its traffic information. The third interworking platform compares a pre-stored password obtained from the traffic information of the subscriber terminal with the password received from the subscriber terminal, and accordingly determines the authentication result of the subscriber terminal.

The traffic information may include authentication information to be used in the authentication of each subscriber terminal for the third party site. In this case, the third interworking platform may perform the authentication of the subscriber terminal using the authentication information. After the authentication, the third interworking platform may reconfirm whether the subscriber terminal agrees to use its traffic information. Upon reception of a password from the subscriber terminal in response to the reconfirmation, the third interworking platform determines that the subscriber terminal agrees to use its traffic information. The third interworking platform then compares a pre-stored password obtained from the traffic information of the subscriber terminal with the password received from the subscriber terminal, and accordingly determines the authentication result of the subscriber terminal.

In case of substituting for payment for the subscriber terminal, the third interworking platform, upon reception of a request to confirm a purchase of the subscriber terminal that includes payment request information of the subscriber terminal, forwards the purchase confirmation and shipping information request to the subscriber terminal. In return, the third interworking platform, upon reception of a reply to the purchase confirmation and shipping information request from the subscriber terminal that the purchase has been confirmed, forwards a payment request for the purchase and payment related information of the subscriber terminal included in the policy information to a charging system.

While the present invention has been particularly shown and described with reference to embodiments thereof, it will be understood by those of ordinary skill in the art that various changes in form and details may be made therein without departing from the spirit and scope of the present invention as defined by the following claims.

The invention claimed is:

1. A computer implemented method using at least one hardware processor for receiving a third party service at a terminal in a mobile communication system, the method comprising:
    performing, by the hardware processor, an access procedure with a mobile communication server, so that the mobile communication server obtains subscriber information of the terminal and transmits the subscriber information to a third party server;
    transmitting, to the mobile communication server, a third party service request to be forwarded to the third party server; and
    if authenticating of the terminal is performed successfully based on the subscriber information of the terminal receiving, from the third party server, the third party service,
    wherein the authenticating of the terminal is performed by mapping the third party service request to subscriber information of the terminal.

2. The method of claim 1, further comprising:
    after transmitting of the third party service request, receiving, from the third party server, login option selection information comprising an auto login option for the third party service;
    determining whether to use the auto login option; and
    transmitting, to the third party server, a response comprising whether the auto login option will be used.

3. The method of claim 2, wherein if a result indicates that authenticating of the terminal is successful, receiving, from the third party server, an inquiry message for reconfirming whether to agree to use private information for the auto login option; and
    transmitting, to the third party server, a password in response to the inquiry message,
    wherein the password is received from the mobile communication server in response to the third party service request.

4. A terminal for receiving a third party service in a mobile communication system, the terminal comprising:
    a transceiver configured to transmit and receive a signal; and
    a controller, implemented using at least hardware processor, operably connected to the transceiver,
    wherein the controller is configured to:
    perform an access procedure with a mobile communication server, so that the mobile communication server obtains subscriber information of the terminal and transmits the subscriber information to a third party server; and
    control the transceiver to transmit, to the mobile communication server, a third party service request to be forwarded to a third party server, and control the transceiver to receive the third party service from the third party server if authenticating of the terminal is performed successfully based on the subscriber information of the terminal;
    wherein the authenticating of the terminal is performed by mapping the third party service request to subscriber information of the terminal.

5. The terminal of claim 4, wherein the controller is further configured to:
    control the transceiver to, after transmitting of the third party service request, receive, from the third party server, login option selection information comprising an auto login option for the third party service;
determine using of the auto login option; and
control the transceiver to transmit, to the third party server, a response comprising whether or not the auto login option will be used.

6. The terminal of claim 5, wherein the controller is further configured to:
if a result indicates that authenticating of the terminal is successful, control the transceiver to receive, from the third party server, an inquiry message for reconfirming whether to agree to use private information for the auto login option; and
control the transceiver to transmit, to the third party server, a password in response to the inquiry message,
wherein the password is received from the mobile communication server in response to the third party service request.

7. The method of claim 2, further comprising:
if the response indicates that the auto login option is selected, authenticating the terminal based on subscriber information of the terminal.

8. The terminal of claim 5, wherein if the response indicates that the auto login option is selected, the controller is further configured to authenticate the terminal based on subscriber information of the terminal.

9. A method for providing a third party service to at least one terminal at a third party server, the method comprising:
receiving, from a mobile communication server, subscriber information of at least one terminal, wherein the subscriber information is obtained through an access procedure between the mobile communication server and the terminal;
receiving, from the mobile communication server, a third party service request of a terminal among the at least one terminal;
authenticating the terminal by mapping the third party request to subscriber information of the terminal from the subscriber information of the at least one terminal; and
providing, to the terminal, the third party service based on a result of authenticating of the terminal in response to the third party service request.

10. The method of claim 9, wherein if the result indicates that the authenticating of the terminal is successful, providing the third party service to the terminal.

11. The method of claim 9, wherein the authenticating of the terminal comprises:
transmitting, to the terminal, login option selection information comprising an auto login option for the third party service;
receiving, from the terminal, a response comprising a login option selection result;
if the login option selection result indicates that the auto login option is selected, determining whether the terminal is subscribed to the mobile communication server; and
if the terminal is subscribed to the mobile communication server, authenticating the terminal based on the subscriber information of the terminal.

12. The method of claim 9, wherein if the result indicates that the authenticating of the terminal is successful, transmitting, to the terminal, an inquiry message for reconfirming whether to agree to using private information for an auto login option.

13. The method of claim 12, wherein, if a password is received from the terminal in response to the inquiry message, comparing the password with a predetermined password obtained from the mobile communication server,
if the password and the predetermined password are the same, determining an auto login of the auto login option is successful.

14. The method of claim 12, wherein the subscriber information of the terminal is obtained through an access procedure between the mobile communication server and the terminal.

15. A third party server for providing a third party service to at least one terminal, the third party server comprising:
a transceiver; and
a controller operably connected to the transceiver, and configured to:
control the transceiver to receive, from a mobile communication server, subscriber information of at least one terminal, wherein the subscriber information is obtained through an access procedure between the mobile communication server and the at least one terminal;
control the transceiver to receive, from the mobile communication server, a third party service request of a terminal among the at least one terminal;
authenticate the terminal by mapping the third party request to subscriber information of the terminal from the subscriber information of the at least one terminal; and
control the transceiver to provide, to the terminal, the third party service based on a result of authenticating of the terminal in response to the third party service request.

16. The third party server of claim 15, wherein, if the result indicates that the authenticating of the terminal is successful, the controller is further configured to control the transceiver to provide the third party service to the terminal.

17. The third party server of claim 15, wherein the controller is further configured to:
control the transceiver to transmit, to the terminal, login option selection information comprising an auto login option for the third party service, and
control the transceiver to receive, from the terminal, a response comprising a login option selection result; and
if the login option selection result indicates that the auto login option is selected, determine whether the terminal is subscribed to for the mobile communication server, and
if the terminal is subscribed to the mobile communication server, control the transceiver to authenticate the terminal based on the subscriber information of the terminal.

18. The third party server of claim 15, wherein if the result indicates that authenticating the terminal is successful, the controller is further configured to control the transceiver to transmit, to the terminal, an inquiry message for reconfirming whether to agree to use private information for an auto login option.

19. The third party server of claim 15, wherein if a password is received from the terminal in response to an inquiry message, the controller is configured to:
compare the password with a predetermined password obtained from the mobile communication server, and
if the password and the predetermined password is the same, determine that an auto login of an auto login option is successful.

20. The third party server of claim 18, wherein the subscriber information of the terminal is obtained through an access procedure between the mobile communication server and the terminal.

* * * * *